(12) United States Patent  
Leland

(10) Patent No.: US 9,349,085 B1  
(45) Date of Patent: May 24, 2016

(54) METHODS AND SYSTEM TO DECODE HIDDEN IMAGES

(71) Applicant: DigiComp Inc., Maple Grove, MN (US)

(72) Inventor: David Leland, Maple Grove, MN (US)

(73) Assignee: DigiComp Inc., Maple Grove, MN (US)

( * ) Notice: Subject to any disclaimer, the term of this patent is extended or adjusted under 35 U.S.C. 154(b) by 0 days.

(21) Appl. No.: 14/717,527

(22) Filed: May 20, 2015

Related U.S. Application Data

(60) Provisional application No. 62/148,430, filed on Apr. 16, 2015.

(51) Int. Cl.  
*H04N 1/32* (2006.01)  
*G06K 19/06* (2006.01)  
*G06T 1/00* (2006.01)  
*G06T 7/00* (2006.01)

(52) U.S. Cl.  
CPC ........ *G06K 19/06009* (2013.01); *G06T 1/0021* (2013.01); *G06T 7/0085* (2013.01); *H04N 1/32341* (2013.01)

(58) Field of Classification Search  
CPC ................ H04N 2201/327; H04N 2201/3233; H04N 1/32144; H04N 1/32341; H04N 1/32352; H04N 21/8358; G06T 1/0028  
See application file for complete search history.

(56) References Cited

U.S. PATENT DOCUMENTS

| | | | |
|---|---|---|---|
| 5,708,717 A | 1/1998 | Alasia | |
| 6,941,323 B1 * | 9/2005 | Galperin | G06F 17/30247 |
| 7,003,161 B2 * | 2/2006 | Tessadro | G06T 7/0083 |
| | | | 382/199 |
| 7,512,248 B2 | 3/2009 | Smith | |
| 7,561,308 B2 | 7/2009 | Alasia et al. | |
| 8,086,062 B2 * | 12/2011 | Lin | G06T 5/20 |
| | | | 382/260 |
| 8,819,652 B2 * | 8/2014 | Zingelewicz | G06F 8/77 |
| | | | 717/135 |
| 2002/0191812 A1 * | 12/2002 | Kim | G06T 1/0028 |
| | | | 382/100 |
| 2008/0044015 A1 | 2/2008 | Alasia | |
| 2014/0339434 A1 * | 11/2014 | Pawlik | B41M 3/144 |
| | | | 250/372 |

OTHER PUBLICATIONS

'Wikipedia.com' [online] "Sobel Operator," last modified on Mar. 3, 2015 [retrieved on May 27, 2015]. Retrieved from the internet: URL <http://en.wikipedia.org/wiki/Sobel_operator> 6 pages.

* cited by examiner

*Primary Examiner* — Matthew Bella  
*Assistant Examiner* — Dennis Rosario  
(74) *Attorney, Agent, or Firm* — Fish & Richardson P.C.

(57) ABSTRACT

In one implementation, a computer-implemented method for identifying hidden features in digital images includes: detecting, by the computer system, one or more visual features in a digital image; applying one or more edge detection filters to the digital image to generate a modified digital image; detecting one or more candidate hidden features that are included in the modified digital image; comparing the one or more visual features in the digital image with the one or more candidate hidden features; determining whether a hidden image is present in the digital image based on the comparison of the one or more visual features in the digital image with the one or more candidate hidden features; and providing, by the computer system and in response to determining that a hidden image is present in the digital image, information that identifies that the hidden image has been detected.

20 Claims, 13 Drawing Sheets

900

1000

1100

1205      1200

1300

METHODS AND SYSTEM TO DECODE HIDDEN IMAGES

CROSS-REFERENCE TO RELATED APPLICATIONS

This application claims the benefit of priority to U.S. Provisional Application Ser. No. 62/148,430, which is entitled "METHODS AND SYSTEM TO DECODE HIDDEN IMAGES" and has a filing date of Apr. 16, 2015. The entire contents of this application are incorporated herein by reference.

BACKGROUND

Businesses and governments have fought counterfeiters and data tampering with the use of hidden image technology. Hidden image technology ("hidden image technology") is the process whereby one image is completely hidden (e.g., not readily perceptible to the naked eye) within another image through the use of various hidden image encoding techniques. Hidden (or secret) images can contain a variety of elements, such as textual, numeric, and/or even photographic data. Hidden images can be used for the purpose of adding a level of security and authenticity to items (e.g., images, documents) that bear the composite encoded image. Hidden image technology can be used in a variety of contexts, such as with payroll checks, shipping cartons, PDF financial documents, secure government documents (e.g., certificates of live birth, driver's licenses, etc.), pharmaceuticals packaging, and banknotes.

While some portions of a document or packaging can be readily counterfeited or altered, images protected with hidden image technology can resist tampering by relying on the use of specialized and controlled software to produce hidden images that may only be perceptible under appropriate circumstances (e.g., special lenses). When variable data such as a name, date, lot codes, or geographic destination codes get embedded as secret data into another image, the decoded secret data can be used to verify the authenticity of human-readable data rendered using ordinary means, and therefore confirm that the human-readable data was not counterfeited or otherwise altered. For instance, a malicious person may be able to readily alter the human-readable data but may not be able to readily alter the same data incorporated as a hidden image.

Methods of decoding a secret image hidden within another image have involved the use of a custom physical lens, such as a lenticular lens with a particular frequency. Different hidden image technology creators have used different lenses and decoding has been limited to specific physical lens is in the possession of the decoding person or system.

SUMMARY

This document generally describes data processing systems and methods for decoding encoded hidden images of multiple different types and without foreknowledge of encoding parameters that were used to encode the hidden images. For example, encoded images can be decoded using dynamic image processing filters, such as edge detection filters, without having access to information about the encoding techniques or parameters that were used in the encoding techniques to generate the encoded images. Encoded images can include secondary images that are hidden and not readily discernable to the naked eye (e.g., viewers not using any sort of device to augment/modify their view of the encoded images so as to reveal the secondary images). Digital versions of encoded images can be obtained and filters, such as edge detection filters, can be applied to the encoded images with, for example, varying filter parameters until the encoded image is decoded and the hidden image is revealed (e.g., readily perceptible to a viewer).

In one implementation, a computer-implemented method for identifying hidden features in digital images includes: accessing, by a computer system, a digital image; detecting, by the computer system, one or more visual features in the digital image; applying, by the computer system, one or more edge detection filters to the digital image to generate a modified digital image; detecting, by the computer system, one or more candidate hidden features that are included in the modified digital image; comparing, by the computer system, the one or more visual features in the digital image with the one or more candidate hidden features; determining, by the computer system, whether a hidden image is present in the digital image based on the comparison of the one or more visual features in the digital image with the one or more candidate hidden features; and providing, by the computer system and in response to determining that a hidden image is present in the digital image, information that identifies that the hidden image has been detected.

Such a computer-implemented method can optionally include one or more of the following features. The computer-implemented method can further include, in response to determining that the hidden image is not present, modifying one or more parameters that are used by the one or more edge detection filters. The applying, the detecting, the comparing, the determining, and the modifying can be repeatedly performed until the hidden image is identified in the digital image, with the one or more parameters being modified in each iteration to be distinct from previous parameters used in previous iterations. The computer-implemented method can further include accessing, by the computer system, a plurality of predefined parameter sets that correspond to a plurality of hidden image encoding techniques. Modifying the one or more parameters can include selecting the one or more parameters from the plurality of predefined parameter sets. Modifying the one or more parameters can further include, after exhausting the plurality of predefined parameters, iteratively adjusting the one or more parameters through one or more ranges of values for the one or more parameters. The computer-implemented method can further include storing, as part of the plurality of predefined parameter sets and in response to determining that the hidden image is present in the digital image, a set of the one or more parameters that, when applied with the one or more edge detection filters to the digital image, resulted in detection of the hidden image.

Modifying the one or more parameters can include iteratively adjusting the one or more parameters through one or more ranges of values for the one or more parameters. The one or more parameters can include one or more of: a texture element width parameter, a texture element height parameter, and an edge strength parameter. The hidden image can include at least a portion of the one or more candidate hidden features. The at least a portion of the one or more candidate hidden features can be different from the one or more visual features in the digital image. The digital image can be selected from the group consisting of: a digital scan of a physical object, a digital image of a physical object, and an electronic document.

The computer-implemented method can further include determining, by the computer system, one or more image transformations to apply to the digital image. The applying can further include applying the one or more image transformations to the digital image to generate the modified digital image. The computer-implemented method can further include, in response to determining that the hidden image is not present, modifying the one or more image transformations. The applying, the detecting, the comparing, the determining, and the modifying can be repeatedly performed until the hidden image is identified in the digital image, with the one or more image transformations being modified in each iteration to be distinct from previous image transformations used in previous iterations.

In another implementation, a computer-implemented method for identifying hidden features in digital images includes: accessing, by a computing device, a digital image; repeatedly applying, by the computing device, one or more edge detection filters to the digital image until a hidden image is detected, wherein each iteration of the repeatedly applying includes: selecting, by the computing device, one or more parameters for the one or more edge detection filters, generating, by the computing device, a modified digital image by applying the one or more edge detection filters to the digital image using the one or more parameters, and detecting, by the computing device, whether the hidden image is visible in the modified digital image; and outputting, by the computing device and in response to detecting the hidden image, information identifying the hidden image detected from the digital image.

Such a computer-implemented method can optionally include one or more of the following features. The one or more parameters can be selected from a plurality of predefined parameter sets that correspond to a plurality of hidden image encoding techniques. The computer-implemented method can further include, after exhausting the plurality of predefined parameters, iteratively adjusting the one or more parameters through one or more ranges of values for the one or more parameters. The computer-implemented method can further include storing, as part of the plurality of predefined parameter sets and in response to detecting the hidden image, a set of the one or more parameters that, when applied with the one or more edge detection filters to the digital image, resulted in detection of the hidden image.

A set of the one or more parameters that are used at each iteration can be distinct from previous parameter sets used in previous iterations of the repeatedly applying for the digital image. The one or more parameters can include one or more of: a texture element width parameter, a texture element height parameter, and an edge strength parameter. Detecting whether the hidden image is visible in the modified digital image can include: displaying, by the computing device, the modified digital image; and receiving, at the computing device, user input that indicates whether the hidden image is visible in the modified digital image.

Selecting the one or more parameters for the one or more edge detection filters can include: outputting, by the computing device, a user interface with one or more selectable features that correspond to the one or more parameters; and receiving, at the computing device and through the user interface, user input including modification of at least a portion of the one or more parameters using the one or more selectable features. Accessing the digital image can include obtaining, by the computing device, the digital image using one or more digital cameras that are accessible to the computing device.

Certain implementations, may provide one or more advantages. For example, ranges of decodable hidden images can be increased by using, for example, transformational filter sets as well as post-processing image filters. Such decoding techniques through the use of various filters can be performed without having access to information regarding encoding techniques and/or encoding parameters that were used to generate encoded images.

In another example, the detection and decoding of multiple different types of hidden images can be performed and/or automated, for example, without information describing the encoding techniques and/or the encoding parameters that were used to generate the encoded images containing the hidden images.

In a further example, the detection and decoding of hidden images can be automated by receiving a digitized encoded hidden image and supplying as output data incorporated as content of the hidden image, without having access to information about the encoding techniques, the encoding parameters, or the encoded content.

The details of one or more embodiments are set forth in the accompanying drawings and the description below. Other features and advantages will be apparent from the description and drawings, and from the claims.

DESCRIPTION OF THE DRAWINGS

Like reference symbols in the various drawings indicate like elements.

DETAILED DESCRIPTION

This document generally describes computer-based techniques, systems, devices, and/or program products for decoding multiple different types of encoded images so as to reveal hidden images. Such decoding can be performed without the use of, for example, physical optical decoding devices and/or decoding techniques that are specialized for decoding a single type of encoded image. Any of a variety of appropriate digital images containing hidden images can be decoded, such as images presented on a digital display devices (e.g., electronic documents), as well as images transferred to a substrate, such as printing on paper or laser engraving a surface. Filter-based decoding can be used to provide authentication as well as data verification across a spectrum of encoding technologies, which can simplify authentication and verification processes for a wide variety of items.

Encoded images can be used for the protection of documents and other items by optically encoded hidden images within the documents/items. Such hidden images can be embedded in a background or source image and printed on items that may be subject to alteration, falsification or counterfeiting. The term "encoded image" can refer to an image that is manipulated and/or hidden within a background field or within another image in such a way that when viewed, the encoded image cannot be discerned by the human eye without the use of a decoding device (e.g., specialized optical lens). Some encoded images are hidden so that their presence is difficult to discern from a background or primary image. Other encoded images are easily visible but not readable because the image content has been systematically scrambled or otherwise manipulated.

Some encoded images are configured to be optically decoded using a physical lens, such as a lenticular lens. Such encoded images can take advantage of the ability of the lenticular lens to screen image content based on the lenticule frequency of the lens. These images can be encoded by one of several methods that involve establishing a regularized periodic pattern having a frequency corresponding to that of the lenticular lens to be used as a decoder, then introducing distortions of the pattern that renders the image difficult to discern with the naked eye. Encoded images of this type may be created digitally using, for example, specialized software applications and/or latent image encoding techniques using off-the-shelf bitmap editing software.

Figure 7:
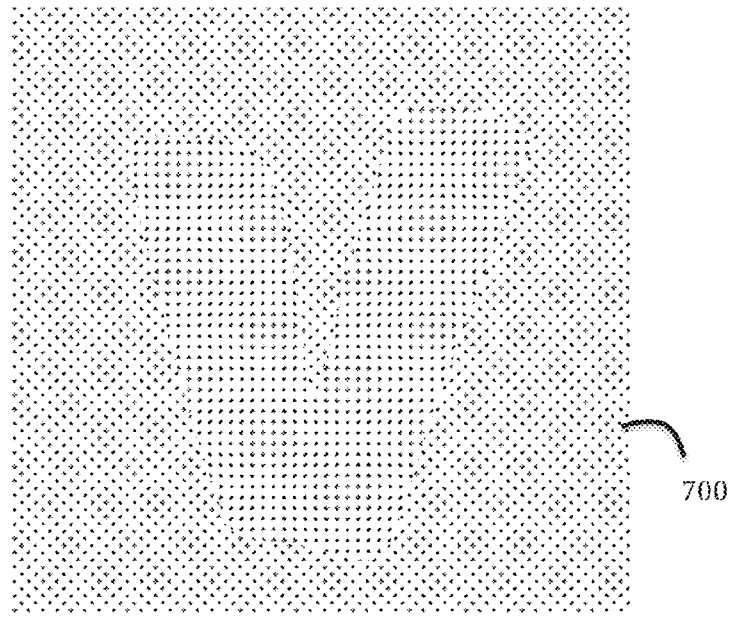
FIG. 7 is an example encoded image formed by phase shifting halftone dots in the region defined by FIG. 4.
Figure 8:
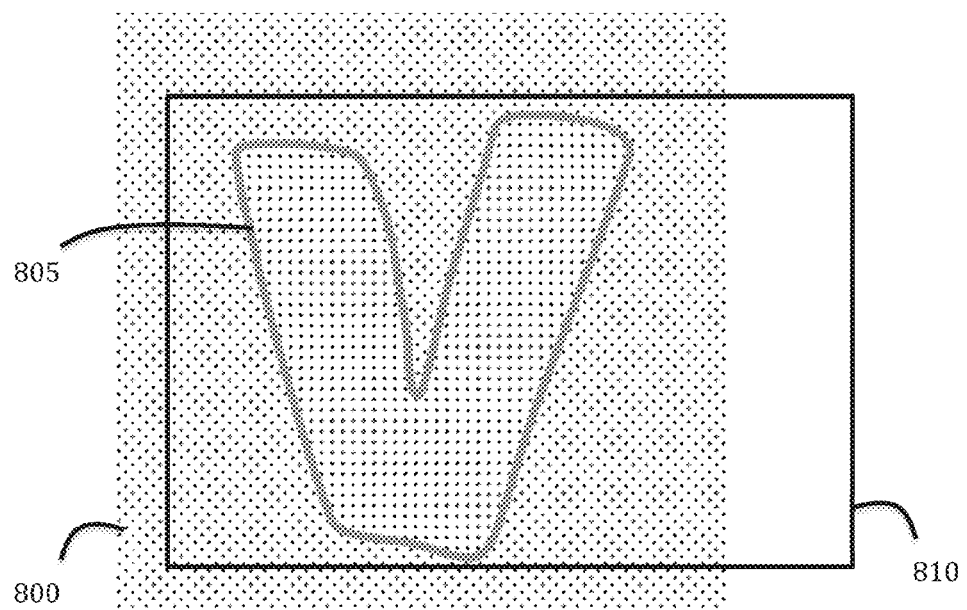
FIG. 8 highlights an example region where the halftone dots are phase shifted and simulates viewing the hidden image with a physical lens.
Figure 11:
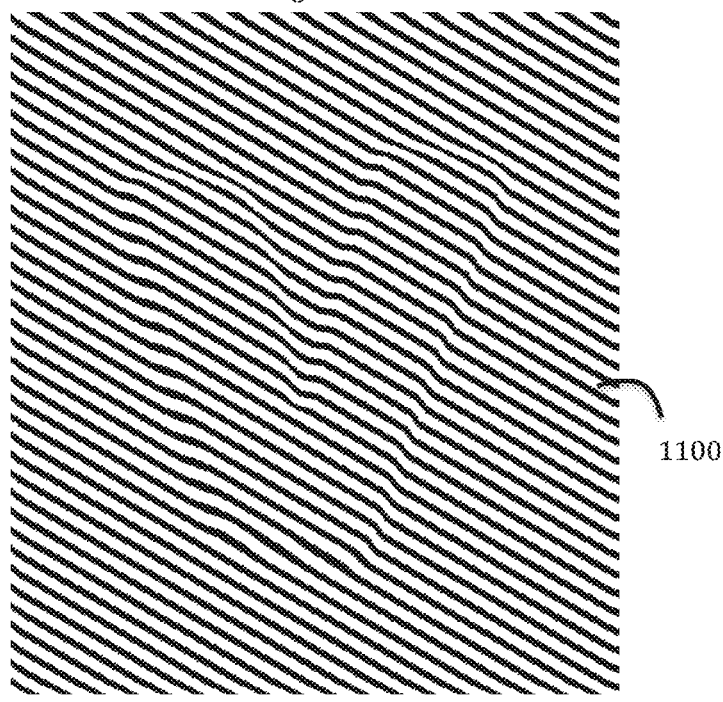
FIG. 11 is an example encoded image formed by deforming parallel lines as a relief in the region defined by FIG. 4.

Encoded hidden images can be embedded into a background or into other images so that the mere presence of the encoded hidden image is difficult to discern as illustrated, for example, in FIG. 7 and FIG. 11. With reference to FIG. 7, an encoded image 700 may be established using a primary and/or source image, like a pattern of dots or lines, and a secondary image 400 which is embedded into the primary image in such a way that the secondary image 400 can only be viewed with a decoding device such as a lenticular lens 810, rendering the hidden image visible 805.

A variety of techniques can be used to detect hidden elements within encoded images. For example, edge detection filters can be repeatedly applied to digital images using different parameter values in each iteration until a set of parameters are used that reveal hidden elements within the digital images. A variety of parameters can be modified, such as texture element width, texture element height, and/or edge strength parameters that may be used by edge detection filters.

In some implementations, initial sets of parameter values that are used by edge detection filters can be selected from predefined sets of parameter values that correspond to different types of encoding techniques and/or encoding parameters. For example, a first set of parameters may have been determined to be effective at revealing hidden images that were encoded with a first encoding technique and a second set of parameters may have been determined to be effective at revealing hidden images that were encoded with a second encoding technique. In such implementations, if the predefined sets of parameter values have been exhausted without revealing hidden elements, then the parameters can be iteratively varied (e.g., incremented, decremented) until either hidden elements are detected or all possible permutations of parameter values have been tested. If hidden elements are detected through iterative variation of parameters, then the parameter values that were used to reveal the hidden elements may be added to the predefined sets of parameter values.

Hidden elements can be detected in any of a variety of ways. For example, hidden elements can be detected automatically by a computing system, such as a mobile computing device and/or a backend server system. Such automatic detection can include detecting a first set of visual features (e.g., shapes, objects, text, barcodes) in a digital image, applying edge detection filters to the digital image to generate a modified digital image, detecting a second set of visual features in the modified digital image, and then comparing the first and second sets of visual features. If a threshold difference in the visual features across the first and second sets has been detected, then the digital image can be identified as containing hidden elements and the hidden elements can be determined to include at least a portion of the features that are included in the second set but not the first set of visual features. Such a threshold difference can be based on a variety of factors, such as quantity of the features, quality of the features, types of the features (e.g., text, barcodes, images), or any combination thereof.

In another example, hidden elements can be detected based on input from users. For example, a computer system (e.g., mobile computing device, server system) that is testing various edge detection filters on digital images can output (e.g., display) the modified digital images that result from application of edge detection filters and/or various filter parameter settings to the digital images. The computer system can output modified images in rapid succession so that they appear to be an animation (similar to a video) of the different filters and/or filter parameters being applied to the digital images. Such rapid succession can assist a user in qualitatively comparing the results from different filters and/or filter parameters being applied to the digital images so as to identify a filter and/or filter parameters that reveal hidden elements within the digital images. Such computer systems can provide user interfaces through which users can control aspects of the filters and/or filter parameters that are being tested (e.g., control features, such as sliders, through which the user can designate the filter parameters) and/or provide an indication when hidden elements have been revealed (e.g., button user can press to identify the presence of hidden elements, selector that user can use to select/highlight hidden elements).

In some implementations, mobile computing devices (e.g., smartphones, tablet computing devices, media players, wearable devices) that may have access to one or more digital cameras can decode images that are captured by the digital cameras and output hidden elements to the user (e.g., display, audibly output). For example, a user of mobile computing device can download, install, and run a mobile application that can be programmed to capture images using one or more digital cameras on the mobile computing device, to apply filters to the captured images, and to display hidden elements in the captured images on the display of the mobile computing device. Such image capturing, hidden image detection, and outputting of hidden image can be performed on captured still images and/or on live streams of images (e.g., video feed) from the digital cameras. Hidden images can also be detected from digital images that are not taken by the cameras of mobile computing devices, such as images in electronic documents that are transmitted to mobile computing devices. Such applications would provide a user with a tool to authenticate and verify various kinds of hidden images wherever encountered, and without having to know anything about the encoding techniques and/or parameters used to encode the images.

In some implementations, computer systems (e.g., server systems, cloud-based computing systems, one or more computing devices, mobile computing devices) can be programmed to automatically verify/authenticate electronic documents by performing hidden image detection on digital images. For example, a bank may use a backend computer system to verify the authenticity of checks before they are processed by detecting hidden images in digital scans of the checks, which may use any of a variety of hidden image encoding techniques.

Figure 1:
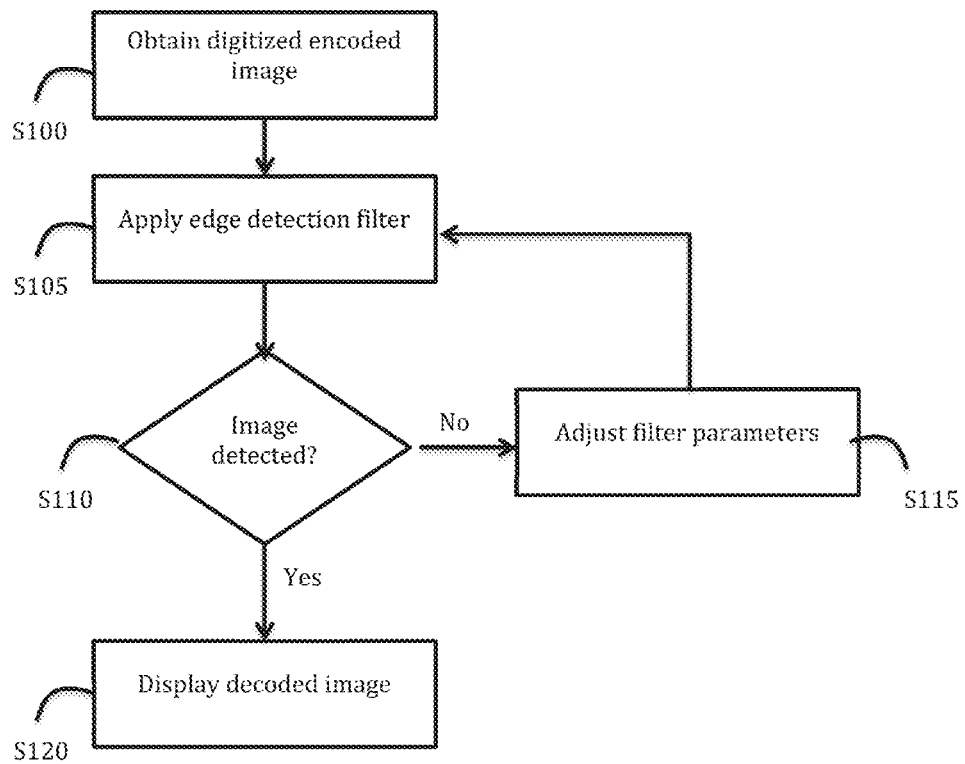
FIG. 1 is a flowchart depicting an example technique for decoding an encoded hidden image.

FIG. 1 is a flowchart depicting an example technique M100 for decoding an encoded hidden image. The example technique M100 can be performed by any of a variety of appropriate computing devices, such as mobile computing devices (e.g., smartphones, tablet computing devices), computer systems (e.g., server systems, cloud-based computer systems, collections of one or more computing devices), or any combination thereof.

The example technique M100 can be performed without having access to information regarding encoding techniques, encoding parameters, and/or image content. The example technique M100 can begin at S100, where a digitized copy of the encoded image is obtained or provided. The digitized encoded image may be a version of the encoded image that is the direct output of an automated encoding process. Alternatively, the digitized encoded image may be obtained by scanning or otherwise capturing via digital still camera or digital video camera an encoded image that has been rendered to a document, product, label, surface or other authenticable item. Any orientation of the camera and/or the target may be used—the example technique M100 can be performed independent of the orientation of the camera and/or the orientation of the target.

At S105, an edge detection filter is applied to the obtained or provided digitized encoded image and produces as output a decoded image candidate. Any of a variety of appropriate edge detection filters can be used, such as a Sobel-type edge detection filter implemented in the OpenGL graphics environment. Sobel image filtering algorithms can be used in image processing and computer vision, and create an image that emphasizes edges and transitions.

An edge detection filter can be used that provide certain specific parameter inputs, such as texture element width parameters, texture element height parameters, and/or edge strength parameters. A texture element, also known as a 'texel', is the base unit of a graphic texture, and in OpenGL is made up of arrays of elements that contain color and alpha values. A Sobel edge detection filter, for example, can be programmed to use parameter values that may be chosen automatically, such as by an automated technique, and/or manually by a user through a user interface with control features (e.g., graphical sliders, text boxes) through which a user can modify, for example, the texel width, texel height, and/or edge strength parameters.

Figure 4:
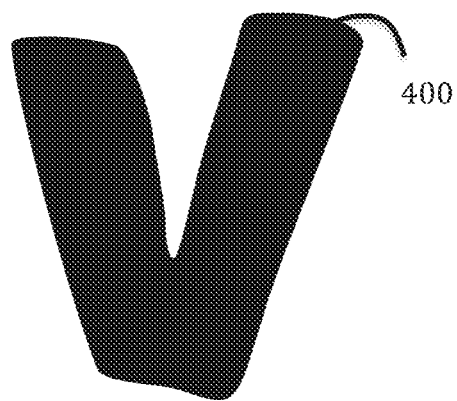
FIG. 4 is an example illustration of an uppercase letter "V" bitmap.
Figure 5:
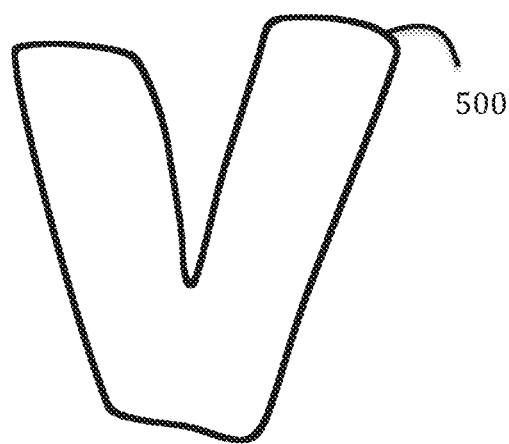
FIG. 5 is an illustration of an example output bitmap of an edge detection filter with an example input of FIG. 4.
Figure 6:
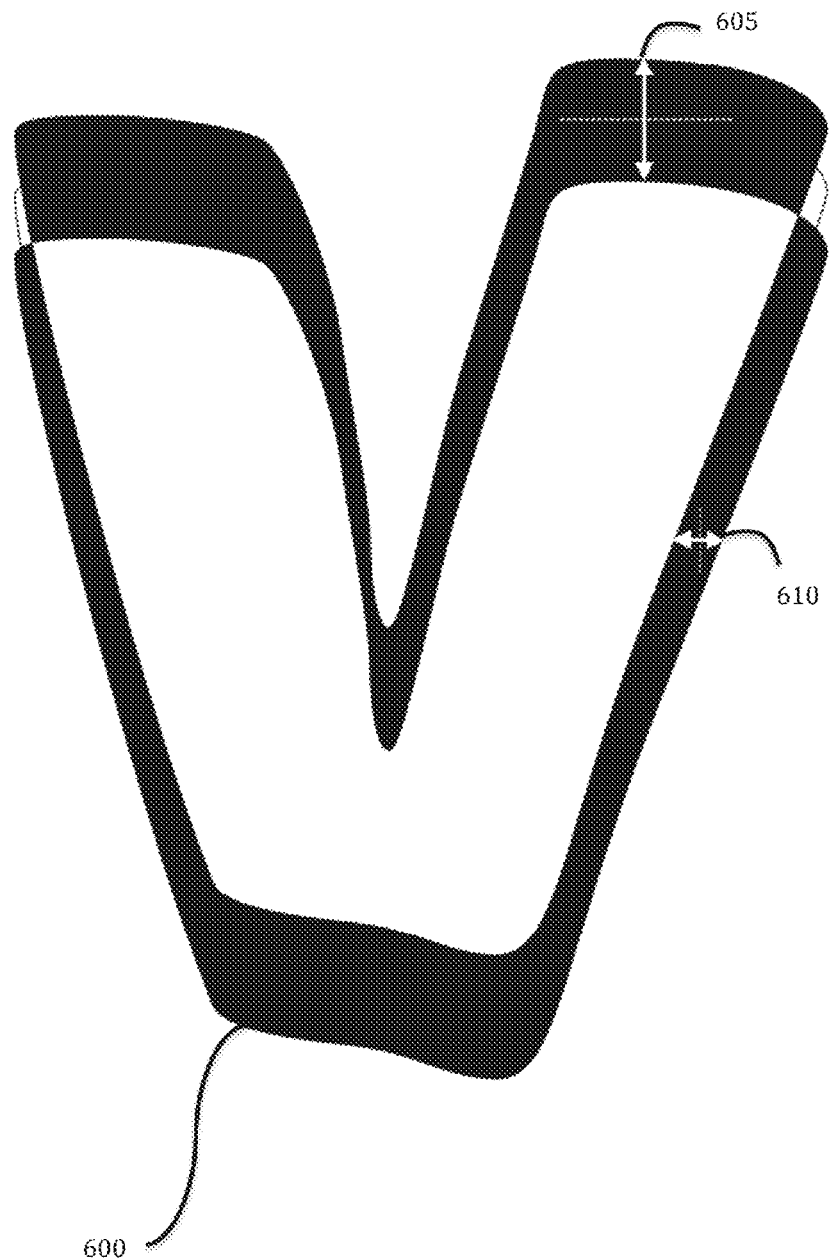
FIG. 6 is an illustration of an example output of an edge detection filter with an example input of FIG. 4 with disparate texel width and height parameters.

Filter parameters can affect a variety of aspects of visual features that are depicted in digital images. For example, edge strength parameters can affect the dynamic range of the filter, where high values can make edges more visible, but can lead to saturation. Texel width and height parameters can change the resulting appearance of the edges. For instance, in FIG. 4 a bitmap 400 was used as input to an edge detection filter, where the texel height and width was set to the inverse of the input bitmap height and width respectively and an edge strength of 1 pixel, resulting in the FIG. 5 output bitmap 500. The edges are uniform in this case. In FIG. 6 an output bitmap 600 from the same input bitmap 400 was created where the texel width was reduced by a factor of 10, resulting in a narrow edge width in the x axis 610, and the texel height was increased by a factor of 10, resulting in an exaggerated edge height in the y axis 605. Variations in such edge detection filter parameters, defined automatically and/or manually, can be used detect and decode hidden images of unknown encoding types and/or encoding parameters.

At S110, a determination is made as to whether a hidden image and/or hidden elements have been successfully decoded. Such a determination can be performed automatically by a computing device and/or manually by a user. For example, a user can be presented with the results of S105 on a display and can provide input (e.g., select button, provide voice command) that indicates whether a hidden image is now discernable. In another example, a computing device (e.g., mobile computing device, computer system) can apply automated feature recognition filters (e.g., optical character recognition (OCR) filters, barcode identification filters, object identification filters) to the output of S105 (modified version of image through application of edge detection filters) to determine whether hidden images and/or hidden features are present in the image being examined. Such an automated determination at S110 can be based upon certain feature recognition parameter output criteria, such as whether there is at least a threshold difference in the features that were detected from the modified image versus the features that were detected in the original image. As discussed above, such a threshold difference can be determined in any of a variety of ways, such as through comparison of the quantity of detected features, the quality of detected features, the type of detected features, or any combination thereof.

If no hidden image or hidden elements are detected, such as based on user input and/or automatic feature detection, the technique M100 can proceed to S115. At S115, edge detection parameter can be adjusted so that the new set of edge detection parameter that will be used are distinct from previous sets of edge detection parameters that have been used for the encoded image. Any of a variety of edge detection parameters can be used and/or adjusted, such as texel width parameters, texel height parameters, and/or the edge strength parameters. Edge detection parameters can be modified manually by a user, such as through features in a graphical user interface (e.g., slider bars, text boxes), and/or automatically, such as by automatic parameter adjustment/selection by a computing device (e.g., changing one or more parameter by increment/decrement values, selecting a set of parameters from a group of predefined parameter sets).

For example, sets of parameter values can be predefined to correspond to various encoding techniques and/or encoding parameters. Such sets of predefined parameter values can be used initially at step S115 and, if they have all been exhausted without locating a hidden image and/or hidden elements, then possible permutations of the parameter values (e.g., increments in values, decrements in values) can be evaluated.

Following the parameter adjustment step S115, the original obtained or provided image from S100 is again sent to the edge detection filter S105 where the modified filter parameters from S115 are used. This provides a new decoded image candidate to be sent to S110. This feedback loop process continues until successful decoding is made—a Yes determination from S110—and the loop stops with final display of the decoded image in S120. In such instances when the hidden image and/or hidden elements are detected, the edge detection parameters that resulted in the hidden image/elements being detected can be stored as a set of predefined parameter values (or, if already in the predefined set, information can be logged regarding the successful use of the parameter set, which can inform future uses of the parameter sets (e.g., sequence with which parameter sets are tried, scenarios in which parameter sets are likely to be effective)). Alternatively, the technique M100 can end when a failure condition has been met, such as all permutations of parameter values having been tested and/or user input indicating that a hidden image/elements are not present.

Figure 2:
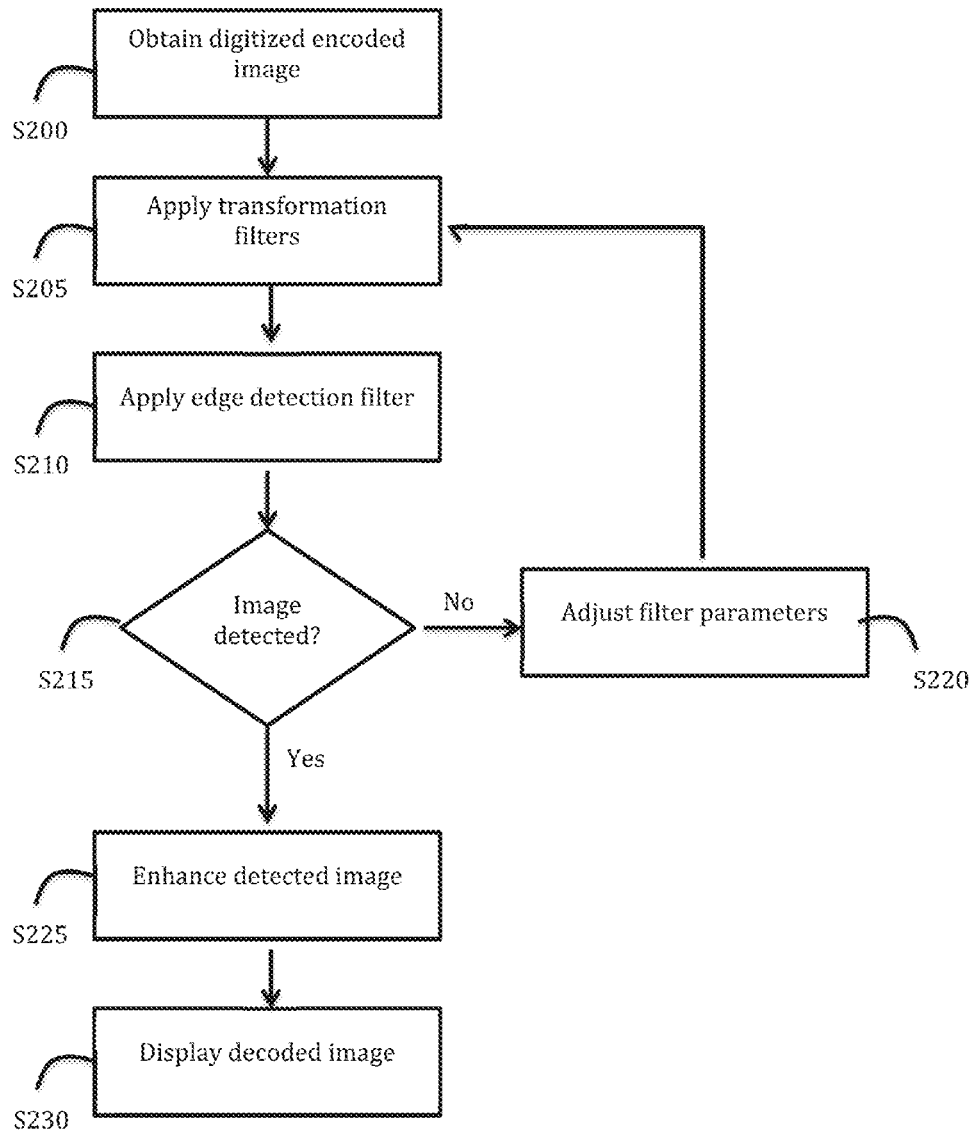
FIG. 2 is a flowchart of an example technique for decoding an encoded hidden image.

FIG. 2 is a flowchart of an example technique M200 for decoding an encoded hidden image. M200 expands on the functionality and capabilities of M100 by introducing a set of transformation filters prior to edge-detection step S210 such as scale, rotation, and translation in S205 as part of the overall dynamic parameter set modified in S220. The transformations in S205, such as scaling, allows method M200 to decode a larger range of encoded images by effectively altering the frequency of the encoded image to something more conducive to the decoding process. Encoded images with a higher frequency encoding may become decodable with M200 that otherwise failed using the technique M100. The transformation step S205 can also allow acquired images from, for example, a camera input, to be successfully decoded from greater distances from the camera lens.

Steps S210, S215, and S220 are similar to the functionality of steps S105, S110, and S115 of M100, respectively. In step S225 enhancement filters are applied, such as blur, contrast, and threshold, to optimize the decoded image. These filters may also be utilized within S215 to improve the decision quality of the detection of a successfully decoded image.

Figure 3:
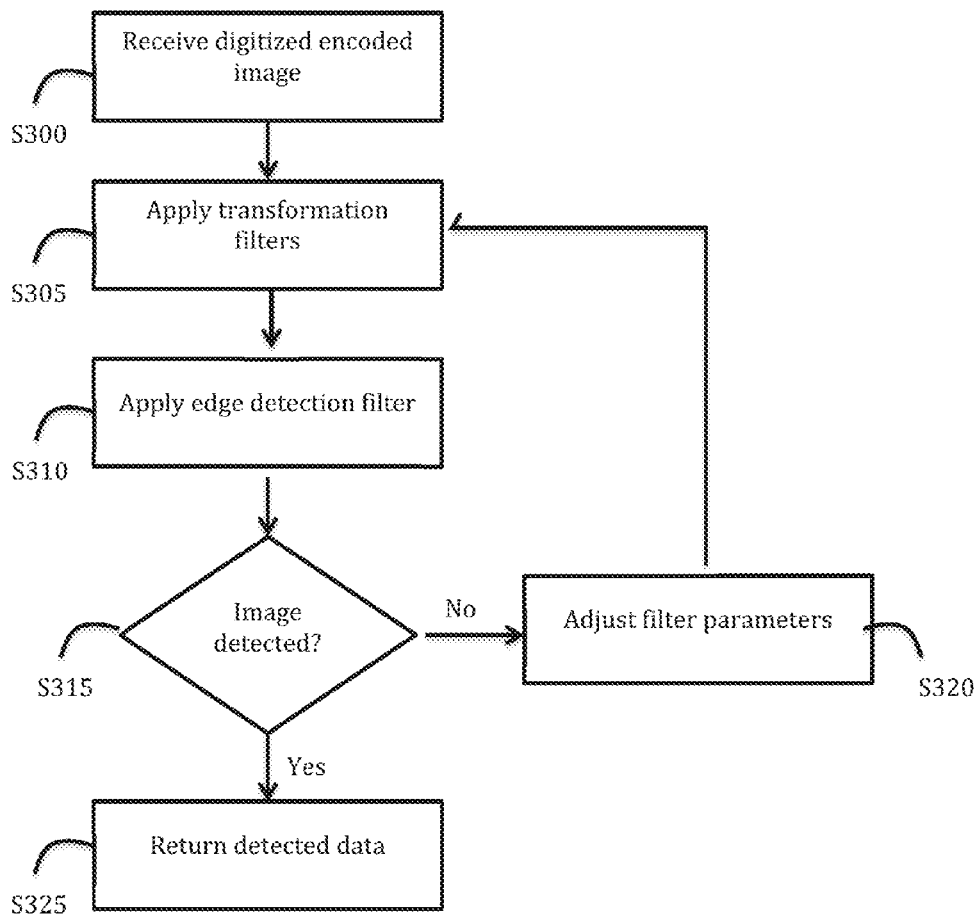
FIG. 3 is a flowchart of an example technique for automating the decoding of an encoded hidden image and return data embedded within the hidden image.

FIG. 3 is a flowchart of an example technique M300 for automating the decoding of an encoded hidden image and return data embedded within the hidden image. In step S300, a digitized encoded image is received. Steps S305, S310, and S320 correspond to steps S205, S210, and S220, respectively. In step S315 a determination as to whether a hidden image/features have been successfully decoded from the digital image made. Such a determination can be based upon, for example, successful extraction/identification of machine-readable data using one or more extraction/identification techniques, such as OCR of text characters or the identification and subsequent reading of a barcode previously hidden but now decoded from the hidden image payload and now readable by available OCR or barcode reading methods. Step S325 returns as output (e.g., display, audibly output) the data successfully decoded in S315.

Figure 9:
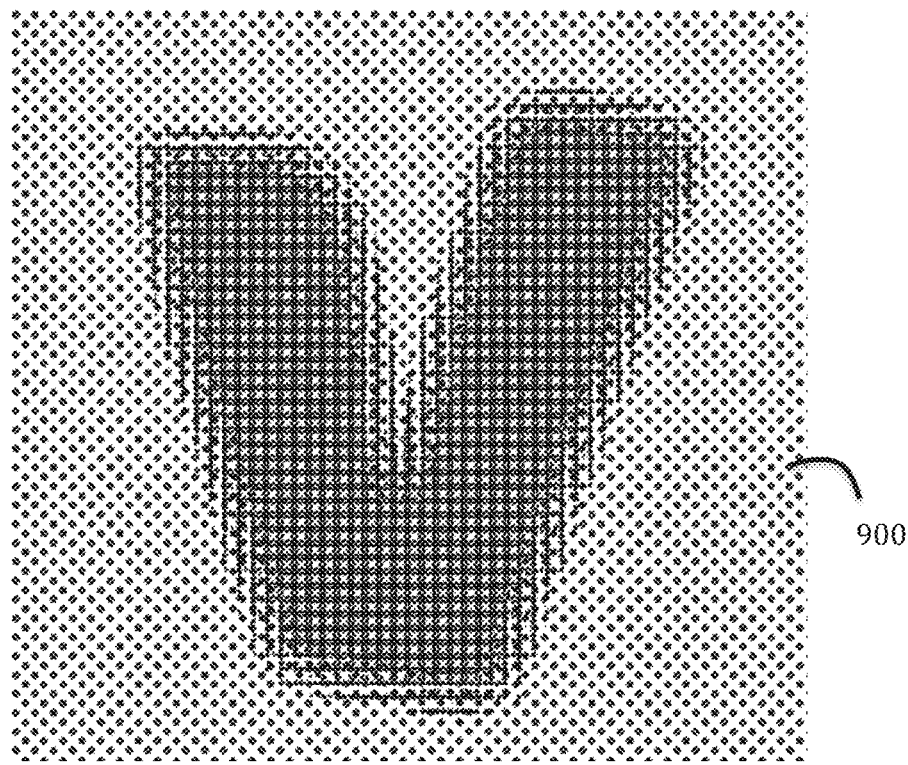
FIG. 9 is an example output bitmap with an example input of FIG. 7.
Figure 10:
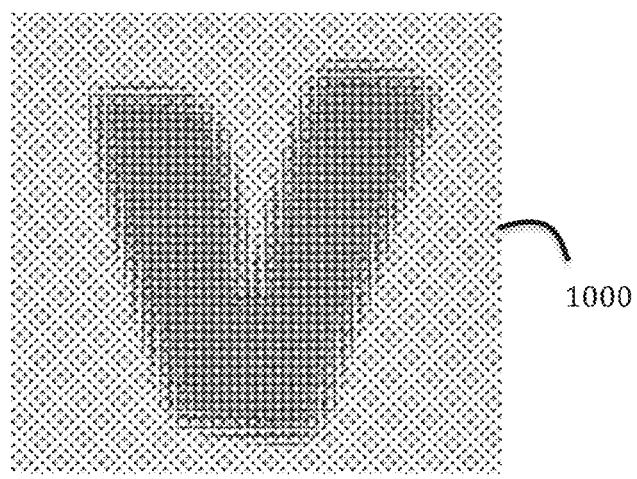
FIG. 10 is an example output bitmap with an example input of FIG. 7.

FIG. 9 shows example output 900 of example technique M100 with input 700 from FIG. 7. In the depicted example, a previously well-hidden capital 'V' shape is now readily apparent. FIG. 10 shows an example output of example technique M200 with input 700 from FIG. 7. Adding a blur and threshold filter in step S315 would enable OCR of the character and enable the example technique M300 to return the data as an ASCII 'V' character, as one possible embodiment of the invention.

Figure 12:
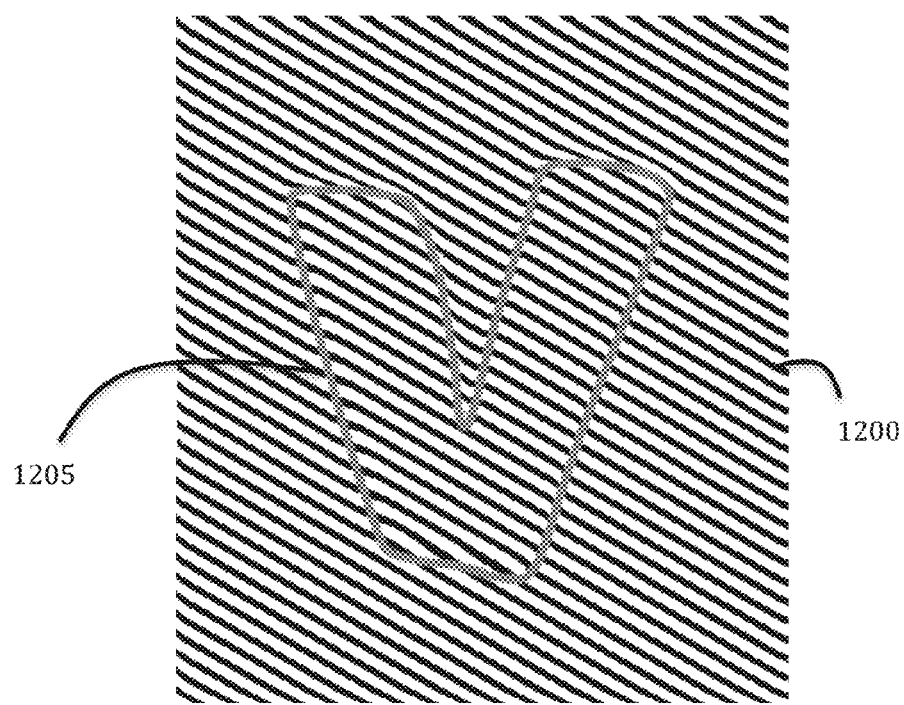
FIG. 12 highlights an example region where the parallel lines are relief shifted.
Figure 13:
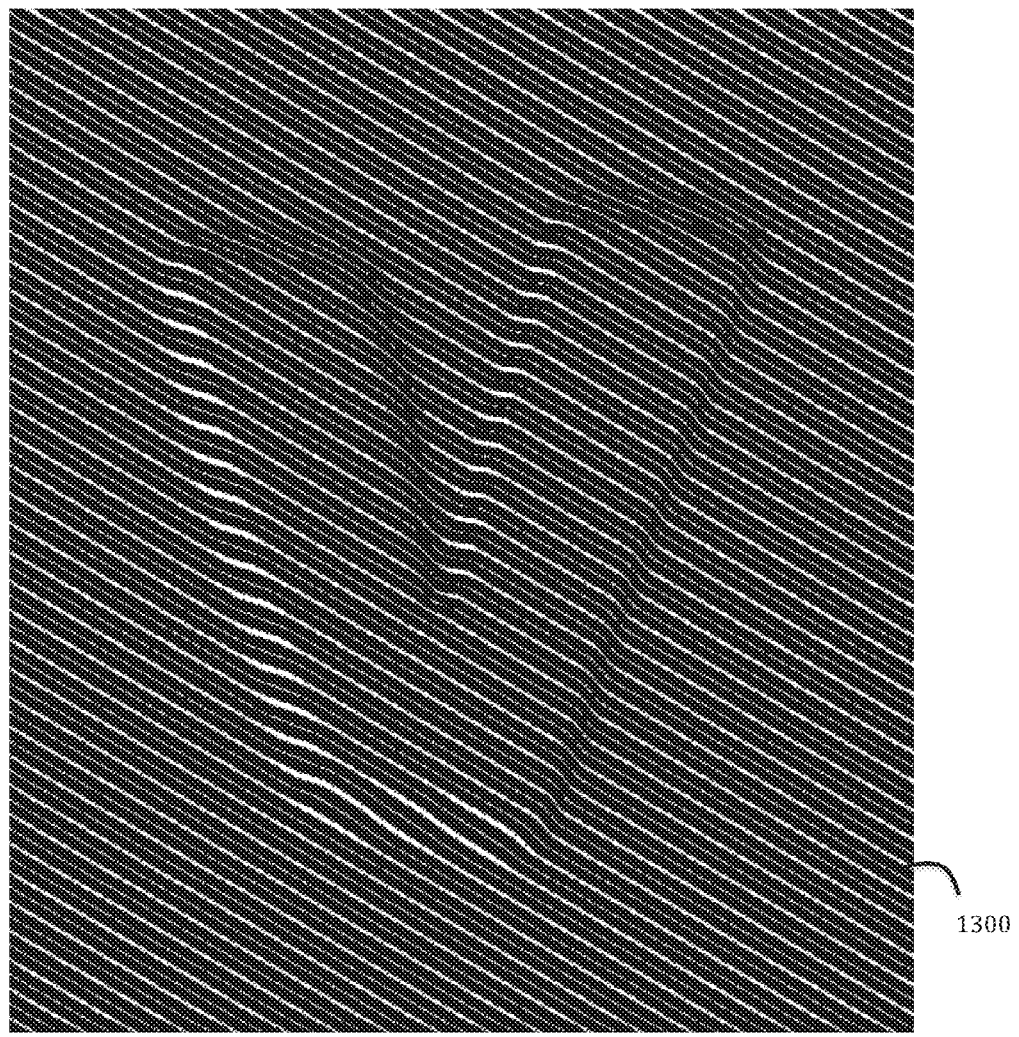
FIG. 13 is an example output bitmap with an example input of FIG. 11.
Figure 14:
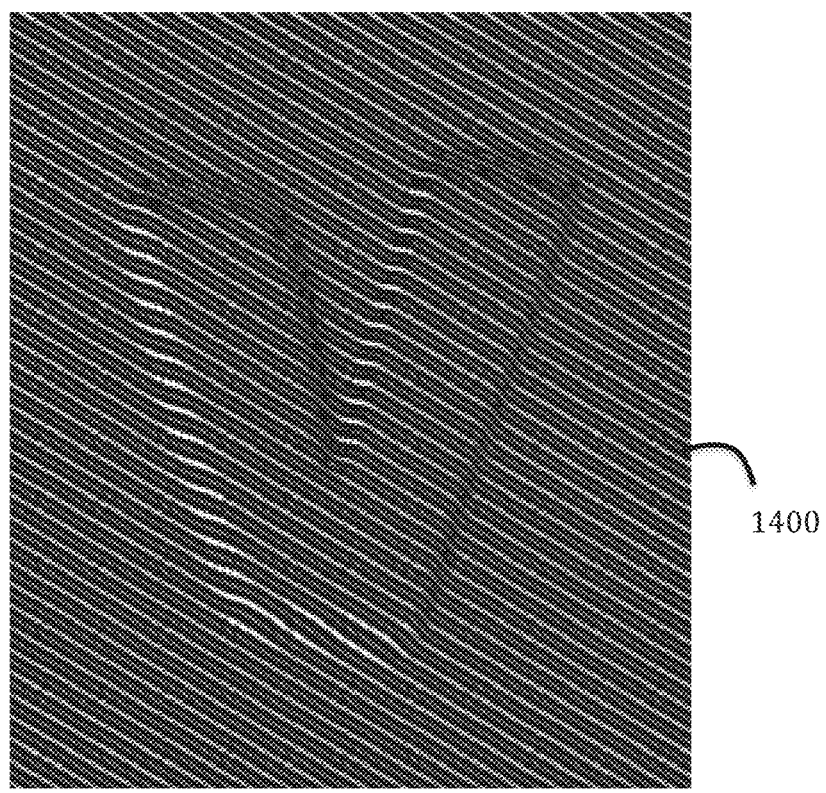
FIG. 14 is an example output bitmap with an example input of FIG. 11.

FIG. 11 depicts an example bitmap 1100 that is an example of a hidden image encoded using an example encoding technique. FIG. 12 depicts the bitmap 1100 with a superimposed outline of a capital 'V' 1205 showing the location of the hidden image within the encoded hidden image 1200. FIG. 13 shows an example output 1300 of the example technique M100 with input 1100 from FIG. 11. In the depicted example, the previously well-hidden capital 'V' shape is now apparent. FIG. 14 shows an example output of the example technique M200 with example input 1100 from FIG. 11, causing the decoded hidden image to be more apparent. Adding a threshold filter coupled with an inverse threshold filter and a colors inversion in step S315 would enable OCR of the character and enable method M300 to return the data as an ASCII 'V' character, as one possible embodiment.

Figure 15:
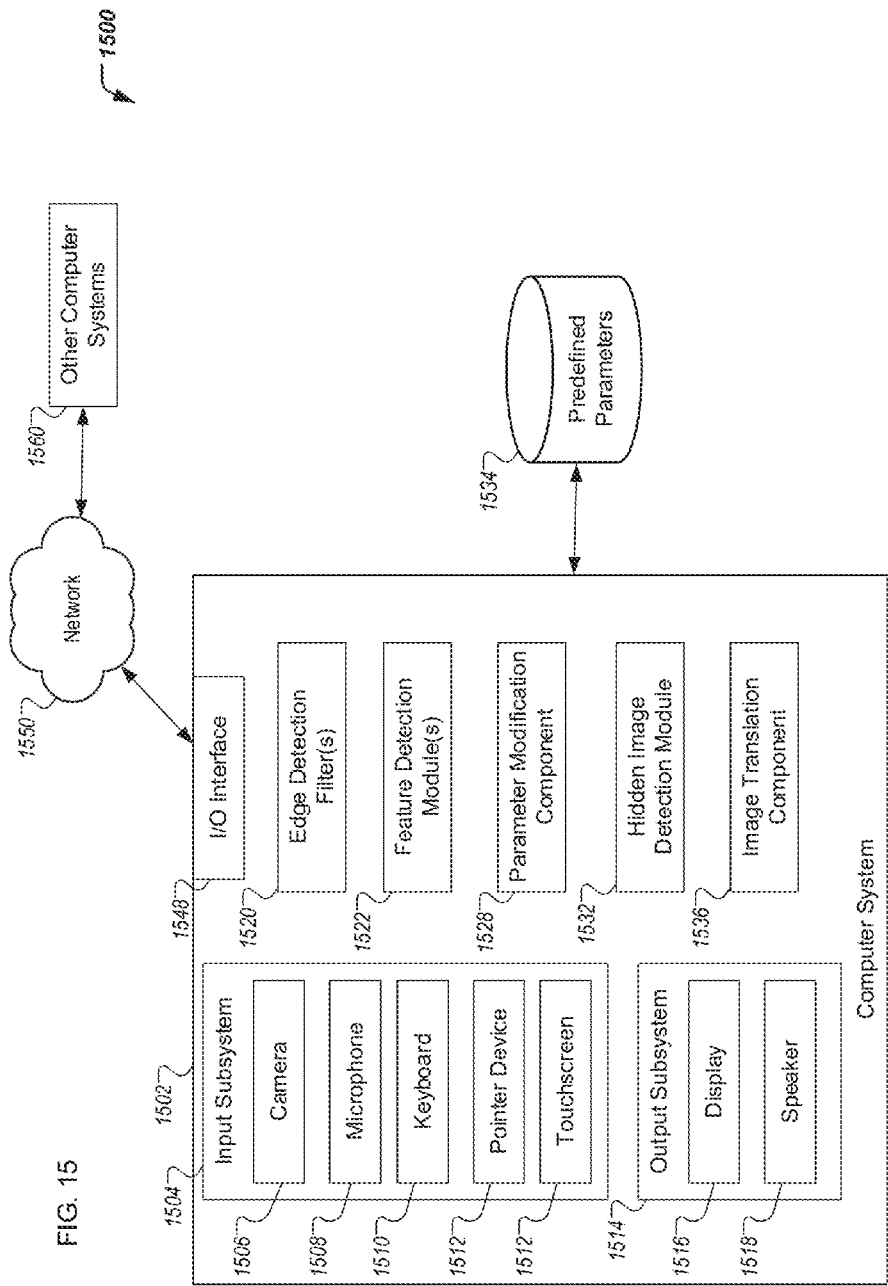
FIG. 15 depicts an example system for decoding digital images.

FIG. 15 depicts an example system 1500 for decoding digital images. The example system 1500 can be used to perform any of the variety of image decoding techniques described throughout this document, such as the example techniques M100, M200, and/or M300. The system 1500 includes an example computer system 1502 that can communicate with other computer systems 1560 over one or more communication networks 1500 (e.g., the internet, local area networks (LAN), wide area networks (WAN), wireless networks, wired networks, or any combination thereof).

The computer systems 1502 and 1560 can include one or more computing devices, such as mobile computing devices, desktop computers, laptops, embedded computing devices, servers, and/or other appropriate computing devices. For example, the computer system 1502 can be a mobile computing device. In another example, the computer system 1502 can be a backend server system.

The computer system 1502 can perform image decoding as described above. The computer system 1502 includes an input subsystem 1504 through which user input can be obtained, such as user input identifying a digital image to be decoded and/or designating one or more parameters for an edge detection filter. The input subsystem 1502 can include one or more cameras 1506 that can capture digital images and/or video streams, a microphone 1508, a keyboard 1510, a pointer device 1512 (e.g., mouse, touchpad), and/or a touchscreen device 1512. Other input mechanisms are also possible.

The computer system 1502 also includes an output subsystem 1514 through which output can be provided to users, such as output identifying one or more hidden images. The output subsystem 1514 includes a display 1516 and one or more speakers 1518.

The computer system 1502 further includes edge detection filters 1520 (e.g., Sobel filters) that are programmed to perform edge detection techniques on a digital image; feature detection modules 1522 (e.g., OCR filters, barcode filters) that are programmed to detect visible features in digital images; a parameter modification component 1528 that is programmed to modify parameters for the edge detection filters 1520 and/or to modify image translation settings used by the image translation component 1536; a hidden image detection module 1532 that is programmed to determine whether a hidden image has been detected, for example, based on comparisons of detected features in an original image and modified images; and an image translation component 1536 that is programmed to translate one or more aspect of an image. The parameter modification component 1528 can modify parameters using predefined parameters 1534. The modification component 1528 may update the predefined parameters 1534 based on the results of hidden image detection using various parameter modifications. The modification component 1528 may also provide a user interface (e.g., through the input subsystem 1504 and output subsystem 1514) through which users can designate parameters and/or settings that are used by the edge detection filters 1520 and/or the image translation component 1536.

One or more of the components 1520-1536 may be implemented using hardware components of the computer system 1502, such as a Graphical Processing Unit (GPU) that can be a dedicated GPU chip capable of increasing the performance of graphical components, such as fragment shaders and/or image filters. For instance, an image processing library and/or frameworks, such as OpenCV, could be used on top of a GPU to provide ready-made image filtering functionality described with regard to the example techniques M100, M200, and M300. For example, a "Sobel Derivative" could be used as an edge detection filter, available in the OpenCV open source library.

The other computer systems 1560 may be any of a variety of other appropriate computing devices and/or systems that can provide data (e.g., parameters) and/or digital images to the computer system 1502 for used in decoding images and identifying hidden images/elements. For example, the computer system 1502 may be a user computing device that submits an image of a check to be deposited and the computer system 1502 can be a backend server system used by a bank to determine whether the check is authentic. In another example, the computer system 1502 may be a user computing device and the other computer system 1560 may be a central computer system that aggregates filter parameter information across a pool of users and provides updated filter parameter information to the computer system 1502.

Figure 16B:
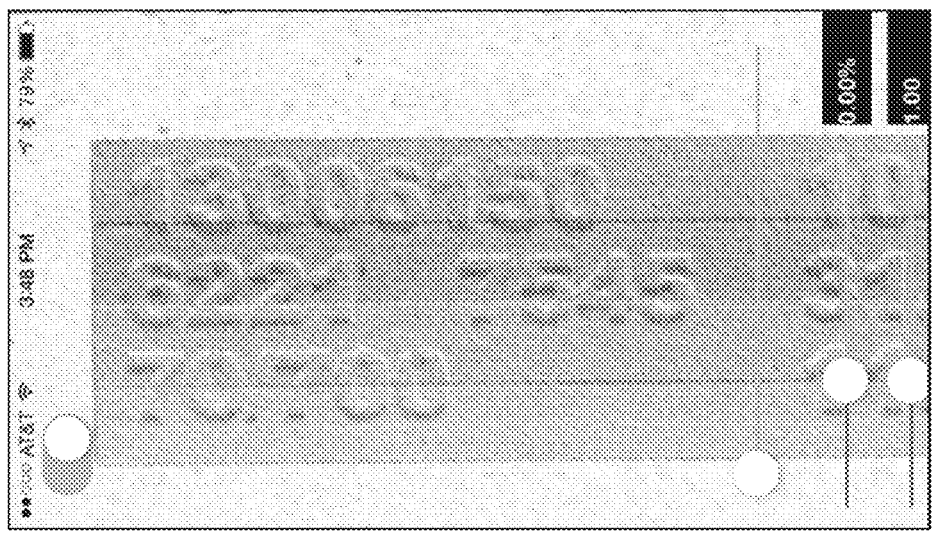
FIGS. 16A-B are screenshots of example user interfaces for decoding an image.
Figure 16A:
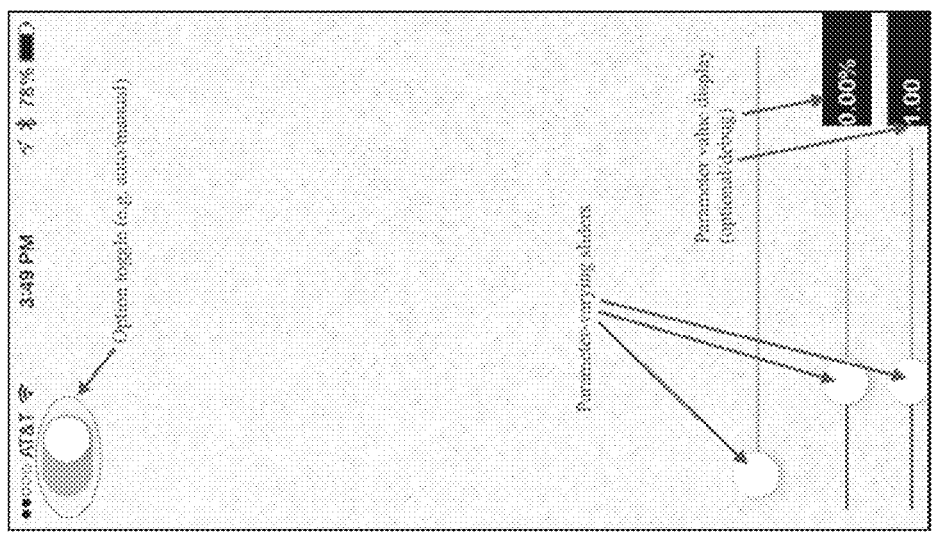

FIGS. 16A-B are screenshots of example user interfaces for decoding an image. The example user interfaces can be presented, for example, by the computer system 1502 and/or other appropriate computing devices. The depicted user interfaces include a radio button (example control) through which a user can designate whether to automatically or manually adjust edge detection parameters, and multiple sliders (example controls) through which the user can adjust parameter values. Example parameter value boxes can output a textual representation of the selected parameter values. FIG. 16A depicts the example controls for adjusting the edge detection parameters, and FIG. 16B depicts an example of a hidden image being displayed in the user interface in response to the parameters being appropriately set for the encoded image.

Figure 17:
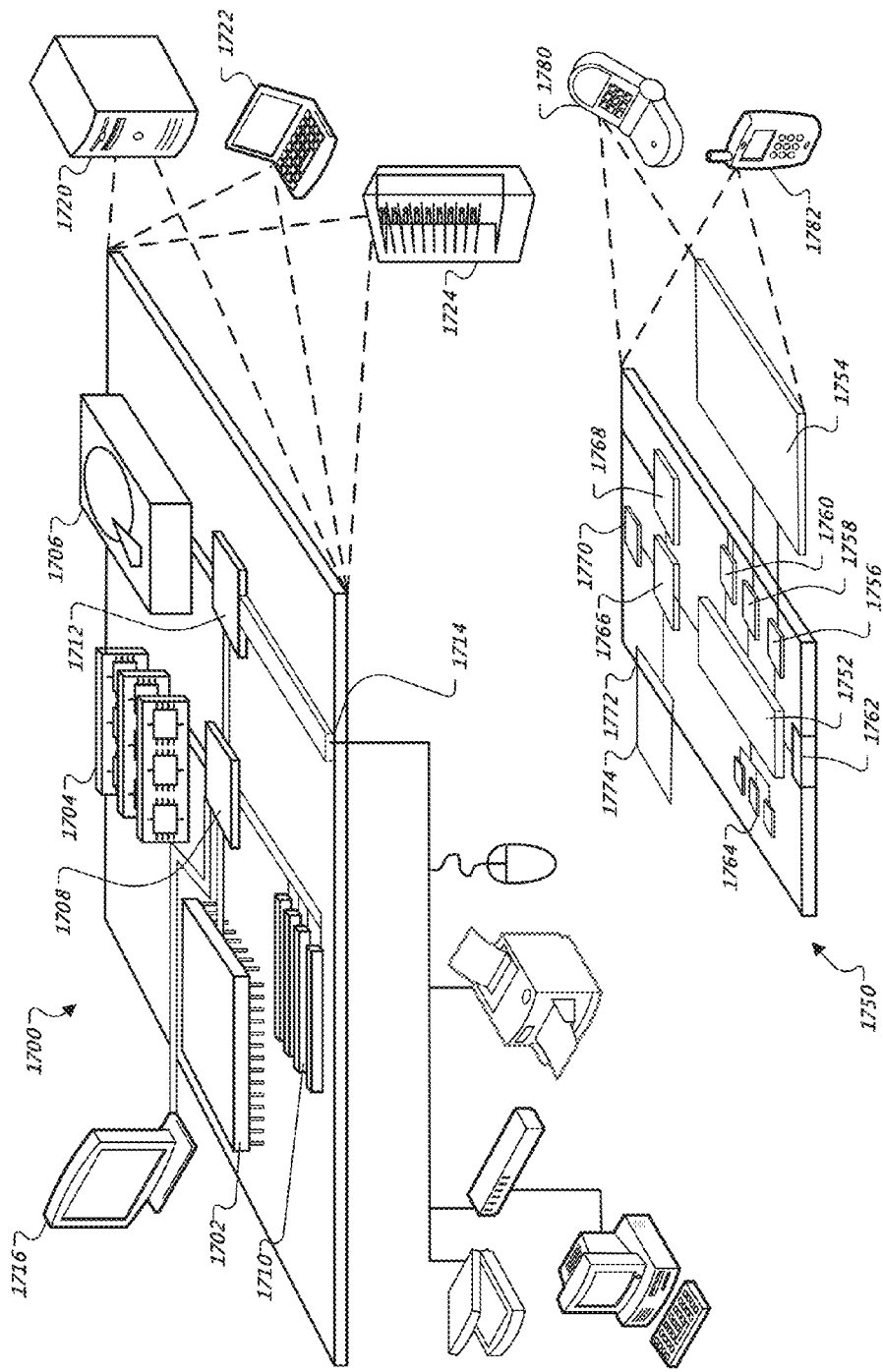
FIG. 17 is a block diagram of example computing devices.

FIG. 17 is a block diagram of computing devices 1700, 1750 that may be used to implement the systems and methods described in this document, as either a client or as a server or plurality of servers. Computing device 1700 is intended to represent various forms of digital computers, such as laptops, desktops, workstations, personal digital assistants, servers, blade servers, mainframes, and other appropriate computers. Computing device 1750 is intended to represent various forms of mobile devices, such as personal digital assistants, cellular telephones, smartphones, and other similar computing devices. Additionally computing device 1700 or 1750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1700 includes a processor 1702, memory 1704, a storage device 1706, a high-speed interface 1708 connecting to memory 1704 and high-speed expansion ports 1710, and a low speed interface 1712 connecting to low speed bus 1714 and storage device 1706. Each of the components 1702, 1704, 1706, 1708, 1710, and 1712, are interconnected using various busses, and may be mounted on a common motherboard or in other manners as appropriate. The processor 1702 can process instructions for execution within the computing device 1700, including instructions stored in the memory 1704 or on the storage device 1706 to display graphical information for a GUI on an external input/output device, such as display 1716 coupled to high speed interface 1708. In other implementations, multiple processors and/or multiple buses may be used, as appropriate, along with multiple memories and types of memory. Also, multiple computing devices 1700 may be connected, with each device providing portions of the necessary operations (e.g., as a server bank, a group of blade servers, or a multi-processor system).

The memory 1704 stores information within the computing device 1700. In one implementation, the memory 1704 is a volatile memory unit or units. In another implementation, the memory 1704 is a non-volatile memory unit or units. The memory 1704 may also be another form of computer-readable medium, such as a magnetic or optical disk.

The storage device 1706 is capable of providing mass storage for the computing device 1700. In one implementation, the storage device 1706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1704, the storage device 1706, or memory on processor 1702.

The high speed controller 1708 manages bandwidth-intensive operations for the computing device 1700, while the low speed controller 1712 manages lower bandwidth-intensive operations. Such allocation of functions is exemplary only. In one implementation, the high-speed controller 1708 is coupled to memory 1704, display 1716 (e.g., through a graphics processor or accelerator), and to high-speed expansion ports 1710, which may accept various expansion cards (not shown). In the implementation, low-speed controller 1712 is coupled to storage device 1706 and low-speed expansion port 1714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1700 may be implemented in a number of different forms, as shown in the figure. For example, it may be implemented as a standard server 1720, or multiple times in a group of such servers. It may also be implemented as part of a rack server system 1724. In addition, it may be implemented in a personal computer such as a laptop computer 1722. Alternatively, components from computing device 1700 may be combined with other components in a mobile device (not shown), such as device 1750. Each of such devices may contain one or more of computing device 1700, 1750, and an entire system may be made up of multiple computing devices 1700, 1750 communicating with each other.

Computing device 1750 includes a processor 1752, memory 1764, an input/output device such as a display 1754, a communication interface 1766, and a transceiver 1768, among other components. The device 1750 may also be provided with a storage device, such as a microdrive or other device, to provide additional storage. Each of the components 1750, 1752, 1764, 1754, 1766, and 1768, are interconnected using various buses, and several of the components may be mounted on a common motherboard or in other manners as appropriate.

The processor 1752 can execute instructions within the computing device 1750, including instructions stored in the memory 1764. The processor may be implemented as a chipset of chips that include separate and multiple analog and digital processors. Additionally, the processor may be implemented using any of a number of architectures. For example, the processor 1752 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1750, such as control of user interfaces, applications run by device 1750, and wireless communication by device 1750.

Processor 1752 may communicate with a user through control interface 1758 and display interface 1756 coupled to a display 1754. The display 1754 may be, for example, a TFT (Thin-Film-Transistor Liquid Crystal Display) display or an OLED (Organic Light Emitting Diode) display, or other appropriate display technology. The display interface 1756 may comprise appropriate circuitry for driving the display 1754 to present graphical and other information to a user. The control interface 1758 may receive commands from a user and convert them for submission to the processor 1752. In addition, an external interface 1762 may be provide in communication with processor 1752, so as to enable near area communication of device 1750 with other devices. External interface 1762 may provide, for example, for wired communication in some implementations, or for wireless communication in other implementations, and multiple interfaces may also be used.

The memory 1764 stores information within the computing device 1750. The memory 1764 can be implemented as one or more of a computer-readable medium or media, a volatile memory unit or units, or a non-volatile memory unit or units. Expansion memory 1774 may also be provided and connected to device 1750 through expansion interface 1772, which may include, for example, a SIMM (Single In Line Memory Module) card interface. Such expansion memory 1774 may provide extra storage space for device 1750, or may also store applications or other information for device 1750. Specifically, expansion memory 1774 may include instructions to carry out or supplement the processes described above, and may include secure information also. Thus, for example, expansion memory 1774 may be provide as a security module for device 1750, and may be programmed with instructions that permit secure use of device 1750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1764, expansion memory 1774, or memory on processor 1752 that may be received, for example, over transceiver 1768 or external interface 1762.

Device 1750 may communicate wirelessly through communication interface 1766, which may include digital signal processing circuitry where necessary. Communication interface 1766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1768. In addition, short-range communication may occur, such as using a Bluetooth, WiFi, or other such transceiver (not shown). In addition, GPS (Global Positioning System) receiver module 1770 may provide additional navigation- and location-related wireless data to device 1750, which may be used as appropriate by applications running on device 1750.

Device 1750 may also communicate audibly using audio codec 1760, which may receive spoken information from a user and convert it to usable digital information. Audio codec 1760 may likewise generate audible sound for a user, such as through a speaker, e.g., in a handset of device 1750. Such sound may include sound from voice telephone calls, may include recorded sound (e.g., voice messages, music files, etc.) and may also include sound generated by applications operating on device 1750.

The computing device 1750 may be implemented in a number of different forms, as shown in the figure. For example, it may be implemented as a cellular telephone 1780. It may also be implemented as part of a smartphone 1782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing interactive surfaces may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A computer-implemented method for identifying hidden features in digital images, the method comprising:
   accessing, by a computing device, a digital image;
   repeatedly applying, by the computing device, one or more edge detection filters to the digital image until a hidden image is detected, wherein each iteration of the repeatedly applying comprises:
      selecting, by the computing device at each iteration, one or more parameters for the one or more edge detection filters,
      generating, by the computing device at each iteration, a modified digital image by applying the one or more edge detection filters to the digital image using the one or more parameters, and
      detecting, by the computing device at each iteration, whether the hidden image is visible in the modified digital image, wherein the hidden image is visible when at least a portion of the hidden image's contours have at least a threshold level of contrast with regard to other portions of the modified digital image that are adjacent to the hidden image; and
   outputting, by the computing device and in response to detecting the hidden image, information identifying the hidden image detected from the digital image.

2. The computer-implemented method of claim 1, wherein the one or more parameters are selected from a plurality of predefined parameter sets that correspond to a plurality of hidden image encoding techniques.

3. The computer-implemented method of claim 2, further comprising:
   after exhausting the plurality of predefined parameters, iteratively adjusting the one or more parameters through one or more ranges of values for the one or more parameters.

4. The computer-implemented method of claim 3, further comprising:
   storing, as part of the plurality of predefined parameter sets and in response to detecting the hidden image, a set of the one or more parameters that, when applied with the one or more edge detection filters to the digital image, resulted in detection of the hidden image.

5. The computer-implemented method of claim 3, wherein:
   the repeatedly applying is performed until either (i) a hidden image is detected or (ii) an end condition has been met without detecting the hidden image, and
   the end condition comprising (i) the plurality of predefined parameters have been exhausted and (ii) the one or more parameters having been adjusted through the one or more ranges of values.

6. The computer-implemented method of claim 1, wherein a set of the one or more parameters that are used at each iteration are distinct from previous parameter sets used in previous iterations of the repeatedly applying for the digital image.

7. The computer-implemented method of claim 1, wherein the one or more parameters include one or more of: a texture element width parameter, a texture element height parameter, and an edge strength parameter.

8. The computer-implemented method of claim 1, wherein detecting whether the hidden image is visible in the modified digital image comprises:
   displaying, by the computing device, the modified digital image;
   receiving, at the computing device, user input that indicates whether the hidden image is visible in the modified digital image.

9. The computer-implemented method of claim 1, wherein selecting the one or more parameters for the one or more edge detection filters comprises:
   outputting, by the computing device, a user interface with one or more selectable features that correspond to the one or more parameters; and
   receiving, at the computing device and through the user interface, user input comprising modification of at least a portion of the one or more parameters using the one or more selectable features.

10. The computer-implemented method of claim 1, wherein accessing the digital image comprises:
    obtaining, by the computing device, the digital image using one or more digital cameras that are accessible to the computing device.

11. A computing device for identifying hidden features in digital images, the computing device comprising:
    one or more processors; and
    one or more storage devices storing instructions that, when executed, cause the one or more processors to perform operations comprising:
       accessing a digital image;
       repeatedly applying one or more edge detection filters to the digital image until a hidden image is detected, wherein each iteration of the repeatedly applying comprises:
          selecting, at each iteration, one or more parameters for the one or more edge detection filters,
          generating, at each iteration, a modified digital image by applying the one or more edge detection filters to the digital image using the one or more parameters, and
          detecting, at each iteration, whether the hidden image is visible in the modified digital image, wherein the hidden image is visible when at least a portion of the hidden image's contours have at least a threshold level of contrast with regard to other portions of the modified digital image that are adjacent to the hidden image; and outputting, in response to detecting the hidden image, information identifying the hidden image detected from the digital image.

12. The computing device of claim 11, wherein the one or more parameters are selected from a plurality of predefined parameter sets that correspond to a plurality of hidden image encoding techniques.

13. The computing device of claim 12, the operations further comprising:

after exhausting the plurality of predefined parameters, iteratively adjusting the one or more parameters through one or more ranges of values for the one or more parameters.

14. The computing device of claim 13, the operations further comprising:

storing, as part of the plurality of predefined parameter sets and in response to detecting the hidden image, a set of the one or more parameters that, when applied with the one or more edge detection filters to the digital image, resulted in detection of the hidden image.

15. The computing device of claim 13, wherein:

the repeatedly applying is performed until either (i) a hidden image is detected or (ii) an end condition has been met without detecting the hidden image, and the end condition comprising (i) the plurality of predefined parameters have been exhausted and (ii) the one or more parameters having been adjusted through the one or more ranges of values.

16. The computing device of claim 11, wherein a set of the one or more parameters that are used at each iteration are distinct from previous parameter sets used in previous iterations of the repeatedly applying for the digital image.

17. The computing device of claim 11, wherein the one or more parameters include one or more of: a texture element width parameter, a texture element height parameter, and an edge strength parameter.

18. The computing device of claim 11, further comprising:

a display, wherein detecting whether the hidden image is visible in the modified digital image comprises:

displaying, on the display, the modified digital image; and receiving user input that indicates whether the hidden image is visible in the modified digital image.

19. The computing device of claim 11, further comprising:

a display; and an input subsystem that is programmed to receive user input, wherein selecting the one or more parameters for the one or more edge detection filters comprises:

providing, with the display and the input subsystem, a user interface with one or more selectable features that correspond to the one or more parameters; and receiving, through the user interface, user input comprising modification of at least a portion of the one or more parameters using the one or more selectable features.

20. The computing device of claim 11, further comprising:

one or more digital cameras, wherein accessing the digital image comprises obtaining the digital image using the one or more digital cameras.

* * * * *